(12) United States Patent
Yamamoto et al.

(10) Patent No.: US 7,679,260 B2
(45) Date of Patent: Mar. 16, 2010

(54) AXIAL GAP MOTOR

(75) Inventors: Keiichi Yamamoto, Haga-gun (JP);
Hirofumi Atarashi, Shioya-gun (JP);
Shoei Abe, Kawachi-gun (JP); Shigeru Tajima, Tokorozawa (JP)

(73) Assignee: Honda Motor Co., Ltd., Tokyo (JP)

( * ) Notice: Subject to any disclaimer, the term of this patent is extended or adjusted under 35 U.S.C. 154(b) by 263 days.

(21) Appl. No.: 12/000,483

(22) Filed: Dec. 13, 2007

(65) Prior Publication Data
US 2008/0290752 A1 Nov. 27, 2008

(30) Foreign Application Priority Data
Dec. 26, 2006 (JP) .................. P2006-349393

(51) Int. Cl.
*H02K 1/27* (2006.01)
*H02K 21/24* (2006.01)

(52) U.S. Cl. ............ 310/268; 310/156.12; 310/156.35; 310/156.38; 310/156.43; 310/156.82

(58) Field of Classification Search .................. 310/89, 310/156.08, 156.12, 156.16, 156.14, 156.23, 310/156.28, 156.29, 156.32, 156.35, 156.38–156.41, 310/156.43–156.45, 156.53, 156.56, 156.82, 310/261.1, 268
See application file for complete search history.

(56) References Cited

U.S. PATENT DOCUMENTS

| 4,007,387 | A | * | 2/1977 | Rustecki | ..................... 310/181 |
| 4,996,457 | A | * | 2/1991 | Hawsey et al. | .............. 310/268 |
| 5,387,854 | A |   | 2/1995 | McCleer et al. | |
| 5,394,321 | A |   | 2/1995 | McCleer et al. | |
| 5,397,953 | A |   | 3/1995 | Cho | |
| 5,642,009 | A |   | 6/1997 | McCleer et al. | |
| 7,315,102 | B2 | * | 1/2008 | Minagawa | .............. 310/156.32 |
| 2004/0070307 | A1 | | 4/2004 | Haugan et al. | |
| 2005/0194855 | A1 | | 9/2005 | Hasebe et al. | |
| 2005/0285467 | A1 | | 12/2005 | Shimizu | |
| 2008/0129136 | A1 | * | 6/2008 | Abe et al. | .............. 310/156.35 |
| 2008/0290752 | A1 | * | 11/2008 | Yamamoto et al. | ..... 310/156.36 |
| 2009/0243422 | A1 | * | 10/2009 | Atarashi et al. | ....... 310/216.074 |

FOREIGN PATENT DOCUMENTS

| EP | 1 612 913 A2 | 1/2006 |
| EP | 1 850 451 A1 | 10/2007 |
| JP | 59-230453 A | 12/1984 |
| JP | 10-271784 A | 10/1998 |
| JP | 2005-269778 A | 9/2005 |
| JP | 2006-222131 A | 8/2006 |
| WO | WO 2006/077812 A1 | 7/2006 |

* cited by examiner

*Primary Examiner*—Tran N Nguyen
(74) *Attorney, Agent, or Firm*—Arent Fox LLP

(57) ABSTRACT

An axial gap motor including a rotor and stators, wherein: the rotor is provided with a plurality of primary magnet portions, a plurality of auxiliary magnet portions, and a rotor frame; the rotor frame is provided with a plurality of ribs that extend in the radial direction of the rotor frame, and a shaft portion and a rim portion that are integrally connected with each other via the ribs, and the rotor frame houses the primary magnet portions and the auxiliary magnet portions; the primary magnet portions are provided with primary permanent magnet pieces; the auxiliary magnet portions are provided with auxiliary permanent magnet pieces; and each of cross-sectional areas of the ribs which is perpendicular to the radial direction increases from the rim portion side towards the shaft portion side in the radial direction.

5 Claims, 16 Drawing Sheets

AXIAL GAP MOTOR

Priority is claimed on Japanese Patent Application No. 2006-349393, filed Dec. 26, 2006, the contents of which are incorporated herein by reference.

BACKGROUND OF THE INVENTION

1. Field of the Invention

The present invention relates to an axial gap motor.

2. Description of Related Art

Conventionally, an axial gap type of permanent magnet synchronous machine is known (see, for example, Japanese Unexamined Patent Application, First Publication No. H10-271784) that is provided with, for example, a pair of stators that are positioned facing each other so as to sandwich a rotor from both sides in the rotational axis direction thereof, and that forms a magnetic flux loop via the pair of stators.

However, in the permanent magnet synchronous machine according to the above described conventional technology, an improvement in the rigidity of the rotor, and suppression of the vibration and noise that are generated when the permanent magnet synchronous machine is in operation are desired.

The present invention was conceived in view of the above described circumstances, and has an object of providing an axial gap motor that enables an improvement in the rigidity of the rotor.

SUMMARY OF THE INVENTION

In order to solve the above described problem and achieve the desired object, the present invention employs the followings. Namely, an axial gap motor of the present invention includes a rotor that is rotatable around a rotation axis; and stators that face the rotor on at least one side in the direction of the rotation axis, wherein: the rotor is provided with a plurality of primary magnet portions, a plurality of auxiliary magnet portions, and a rotor frame; the rotor frame is provided with a plurality of ribs that extend in the radial direction of the rotor frame, and a shaft portion and a rim portion that are integrally connected with each other via the ribs, and the rotor frame houses the primary magnet portions and the auxiliary magnet portions that are placed alternatingly in the circumferential direction thereof between the shaft portion and the rim portion; the primary magnet portions are provided with primary permanent magnet pieces that are magnetized in the direction of the rotation axis, and that are positioned between two ribs which are adjacent in the circumferential direction; the auxiliary magnet portions are provided with auxiliary permanent magnet pieces that are magnetized in a direction that is orthogonal to the direction of the rotation axis and to the radial direction, and that are positioned on at least one side of the ribs in the direction of the rotation axis; and each of cross-sectional areas of the ribs which is perpendicular to the radial direction increases from the rim portion side towards the shaft portion side in the radial direction.

According to the above described axial gap motor, for the shaft portion that is connected to an external drive shaft and to which torque is transmitted, and for the rim portion that is connected via the plurality of ribs to the shaft portion, the cross-sectional area of the ribs perpendicular to the radial direction gradually increases from the rim portion side towards the shaft portion side in the radial direction. As a result, compared with a case in which, for example, the cross-sectional area of the ribs perpendicular to the radial direction does not change, the rigidity of the rotor frame can be improved.

It may be arranged such that the thickness of the ribs in the direction of the rotation axis increases from the rim portion side towards the shaft portion side in the radial direction; and the thickness of the primary permanent magnet pieces in the direction of the rotation axis increases from the rim portion side towards the shaft portion side in the radial direction.

In this case, the respective thicknesses in the direction of the rotation axis of the ribs and primary permanent magnet pieces that are placed between two adjacent ribs in the circumferential direction gradually increases from the rim portion side towards the shaft portion side in the radial direction. As a result, compared with a case in which, for example, the thicknesses of the ribs and the primary permanent magnet pieces in the direction of the rotation axis does not change, the rigidity of the rotor frame can be improved.

It may be arranged such that the width of the ribs in the circumferential direction increases from the rim portion side towards the shaft portion side in the radial direction.

In this case, the width of the ribs in the circumferential direction gradually increases from the rim portion side towards the shaft portion side in the radial direction. As a result, compared with a case in which, for example, the width of the ribs in the circumferential direction does not change, the rigidity of the rotor frame can be improved.

It may be arranged such that both end surfaces of the auxiliary permanent magnet pieces in the direction of the rotation axis are parallel to each other.

In this case, both end surfaces of the auxiliary permanent magnet pieces in the axial rotation direction, namely, the end surface facing the stators, and the end surface facing the rib are parallel to each other. As a result, when, for example, the cross-sectional configurations of the ribs and the primary permanent magnet pieces in the circumferential direction are the same, the magnetic flux can be suitably converged by the magnetic flux lens effect created by what is known as a Halbach arrangement of the permanent magnets using the primary permanent magnet pieces and the auxiliary permanent magnet pieces.

It may be arranged such that the stator is provided with a pair of a first stator and a second stator that face with each other in the direction of the rotation axis and that sandwich the rotor from both sides in the direction of the rotation axis; and the auxiliary permanent magnet pieces are provided with a pair of a first auxiliary magnet piece and a second auxiliary permanent magnet piece that are positioned on both sides in the direction of the rotation axis of the ribs.

In this case, it is possible to cause the magnetic flux to be more suitably converged using the magnetic flux lens effect generated by what is known as the Halbach arrangement of the permanent magnets using the primary permanent magnet pieces and the first auxiliary permanent magnet piece and the second auxiliary permanent magnet piece.

BRIEF DESCRIPTION OF THE DRAWINGS

FIG. 7A is an exploded perspective view showing principal portions of the rotor of the axial gap motor according to the embodiment, while

FIG. 13A is an exploded perspective view showing principal portions of the rotor of the axial gap motor according to the first variant example of the embodiment, while

FIG. 19A is an exploded perspective view showing principal portions of the rotor of the axial gap motor according to the second variant example of the embodiment, while

DETAILED DESCRIPTION OF THE INVENTION

An embodiment of the axial gap motor of the present invention will now be described with reference to the drawings.

Figure 1:
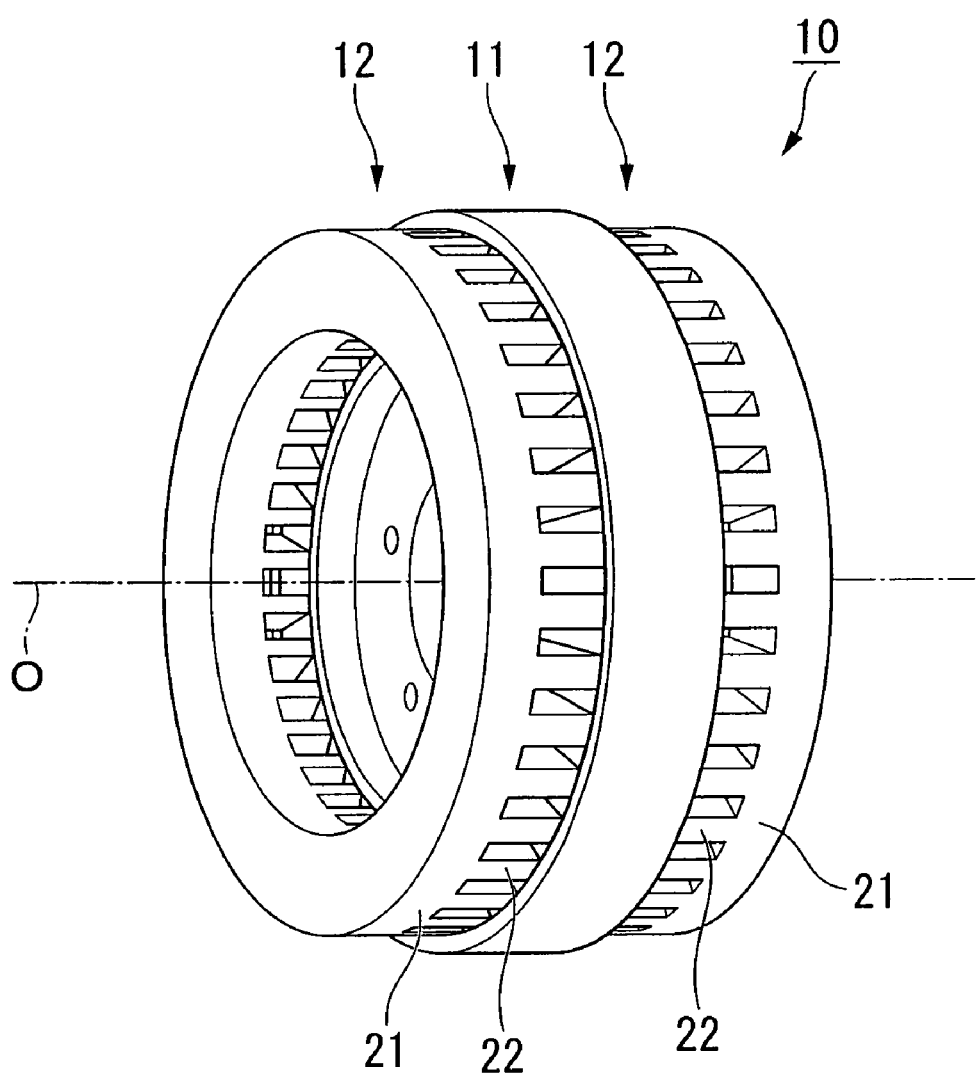
FIG. 1 is a perspective view of an axial gap motor according to an embodiment of the present invention.
Figure 2:
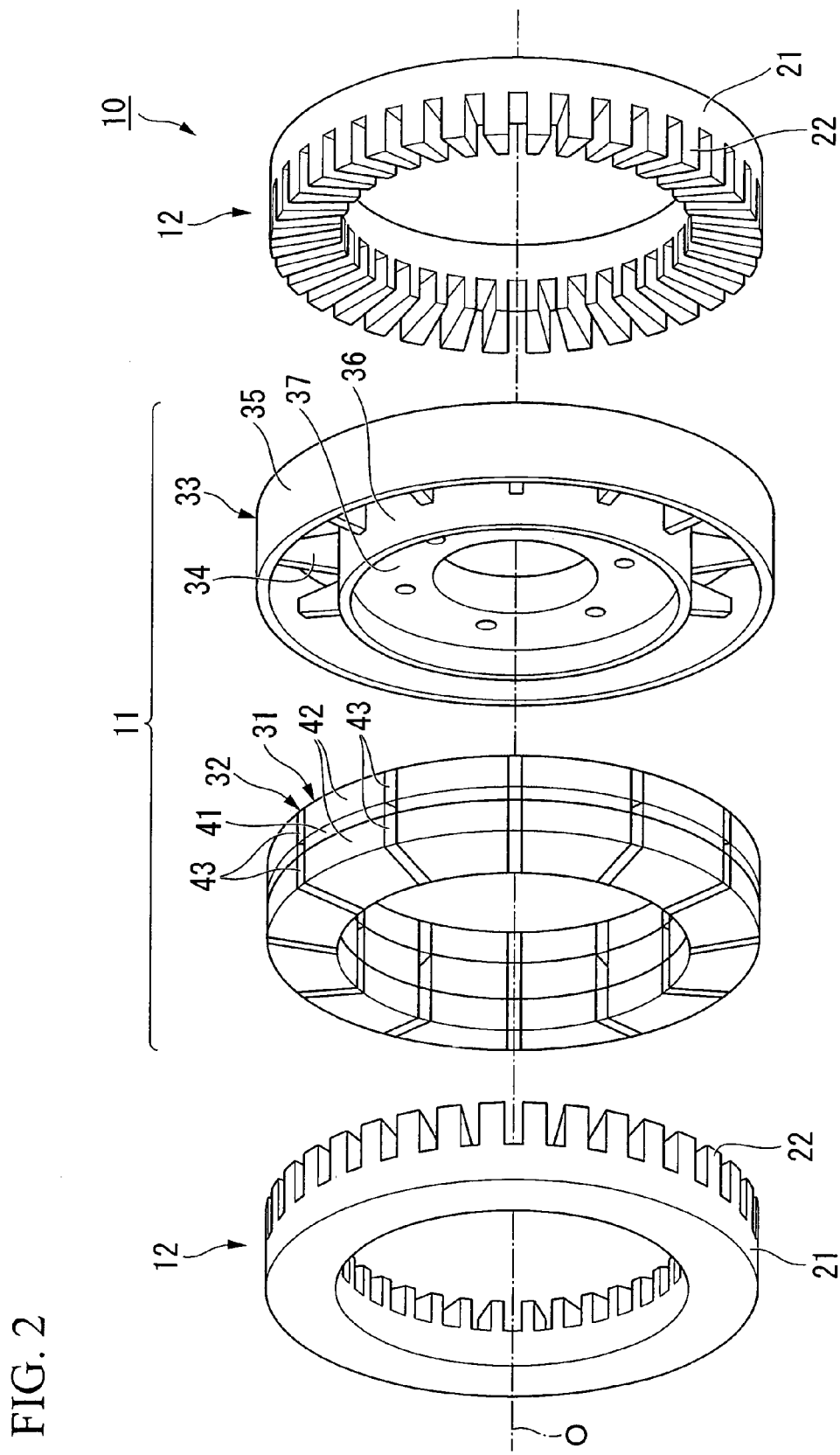
FIG. 2 is an exploded perspective view of a rotor of the axial gap motor according to the embodiment.

As is shown, for example, in FIG. 1 and FIG. 2, an axial gap motor 10 of the present embodiment includes a substantially toroidal rotor 11, and a pair of stators 12 and 12. Here, the substantially toroidal rotor 11 is provided such that it is able to rotate around the rotation axis O of this axial gap motor 10. The pair of stators 12 and 12 are positioned facing each other so as to sandwich the rotor 11 from both sides in the direction of the rotation axis O thereof, and have stator winding coils for a plurality of phases that generate a rotating magnetic field that rotates the rotor 11.

This axial gap motor 10 is mounted as a drive source, for example, in a vehicle such as a hybrid vehicle or an electric vehicle. If an output shaft of this axial motor 10 is connected to an input shaft of a transmission (not shown), then drive force from the axial gap motor 10 is transmitted via the transmission to drive wheels (not shown) of the vehicle.

Moreover, when the vehicle is reducing speed, if drive force is transmitted from the drive wheels side to the axial gap motor 10, then the axial gap motor 10 functions as an electrical generator and that generates what is known as regenerative braking force. As a result, the kinetic energy of the vehicle body can be recovered in the form of electrical energy (i.e., regenerative energy). Furthermore, in a hybrid vehicle, for example, if the rotation shaft of the axial gap motor 10 is linked to the crankshaft of an internal combustion engine (not shown), then the axial gap motor 10 is also able to function as an electrical generator when output from the internal combustion engine is transmitted to the axial gap motor 10, which also results in electrical energy being generated.

Each stator 12 includes a substantially toroidal plate-shaped yoke portion 21, a plurality of teeth 22, . . . , and 22, and a stator winding coil (not shown) that is fitted between the appropriate teeth 22 and 22. Here, the respective teeth 22 extend in a radial direction and also protrude in the direction of the rotation axis O towards the rotor 11 from positions that are spaced a predetermined distance apart in the circumferential direction on the surfaces of the yoke portions 21 that face the rotor 11.

Each stator 12 is, for example, a 6N type that has six main poles (for example, $U^+, V^+, W^+, U^-, V^-, W^-$), and the respective $U^+, V^+,$ and $W^+$ poles of one stator 12 are set so as to be opposed in the direction of the rotation axis O by the respective $U^-, V^-,$ and $W^-$ poles of the other stator 12.

For example, in one pair of stators 12 that mutually face each other in the direction of the rotation axis O, three teeth 22, 22, and 22 of the one stator 12 that correspond to the $U^+, V^+,$ and $W^+$ poles are set such that, in the direction of the rotation axis O, they face the three teeth 22, 22, and 22 of the other stator 12 that correspond to the $U^-, V^-,$ and $W^-$ poles. Namely, an energized state in which the teeth 22 of the one stator 12 and the teeth 22 of the other stator 12 that face each other in the direction of the rotation axis O is set as an inverted state on the basis of the electrical angle.

Figure 3:
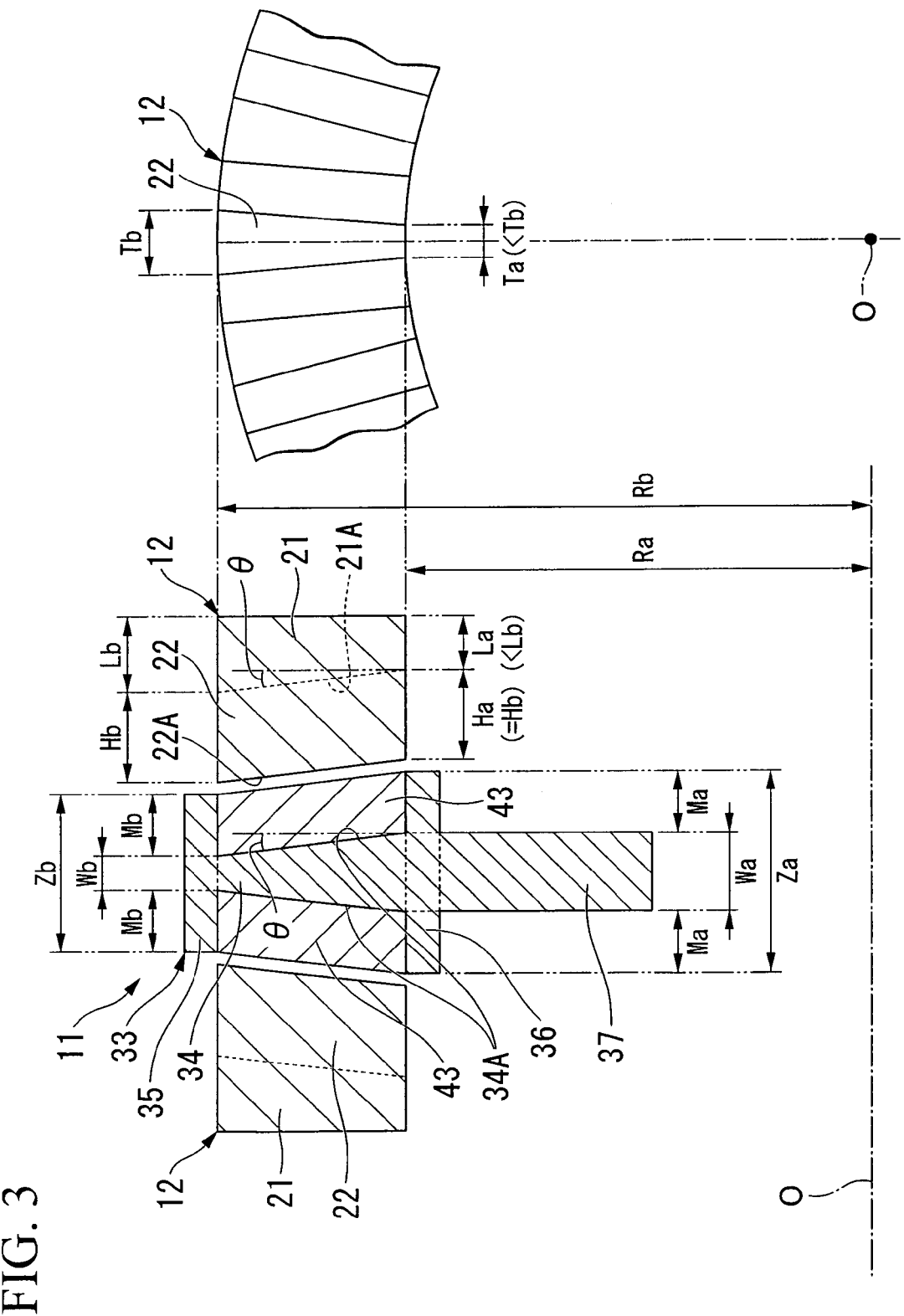
FIG. 3 is a cross-sectional view in a radial direction showing principal portions of the axial gap motor according to the embodiment, and shows teeth of a stator as seen from the direction of a rotation axis O.

As is shown in FIG. 3, for example, an end surface on the rotor 11 side in the direction of the rotation axis O of the yoke portion 21 of each stator 12, namely, a rotor-facing surface 21A has a tapered surface that is inclined by a predetermined angle θ relative to the radial direction. Moreover, the thickness of the yoke portion 21 in the direction of the rotation axis O gradually increases from the inner side towards the outer side in the radial direction, for example, from an inner circumferential side thickness La to an outer circumferential side thickness Lb (>La).

The thickness in the direction of the rotation axis O of the teeth 22 of each stator 12 is the same (i.e., an inner circumferential side thickness Ha is equal to an outer circumferential side thickness Hb) from the inner side towards the outer side in the radial direction. In addition, an end surface on the rotor 11 side in the direction of the rotation axis O of the teeth 22, namely, a rotor-facing surface 22A is inclined by a predetermined angle θ relative to the radial direction.

Moreover, the width in the circumferential direction of the teeth 22 gradually increases from the inner side towards the outer side in the radial direction, for example, from an inner circumferential side width Ta to an outer circumferential side width Tb (>Ta).

Note that the ratio between the inner circumferential side thickness La and the outer circumferential side thickness Lb of the yoke portion 21 may be equal to the ratio between the inner circumferential side width Ta and the outer circumferential side width Tb of the teeth 22 (i.e., La:Lb=Ta:Tb). By employing this structure, the magnetic flux density on the yoke portion 21 is equalized and magnetic flux is prevented from passing in the radial direction.

As is shown, for example, in FIG. 2, the rotor 11 is provided with a plurality of primary magnet portions 31, . . . , and 31, a plurality of auxiliary magnet portions 32, . . . , and 32, and a rotor frame 33 that is formed from a non-magnetic material. The primary magnetic portions 31 and the auxiliary magnet portions 32 are placed alternatingly in the circumferential direction and, in this state, are housed within the rotor frame 33.

Figure 4:
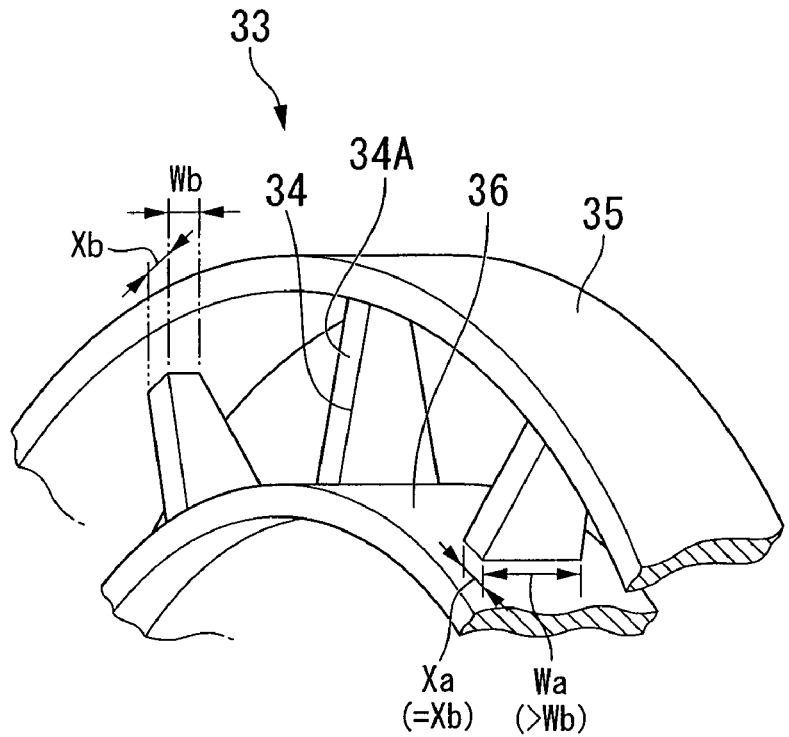
FIG. 4 is a perspective view showing principal portions of a rotor frame of the axial gap motor according to the embodiment.
Figure 5:
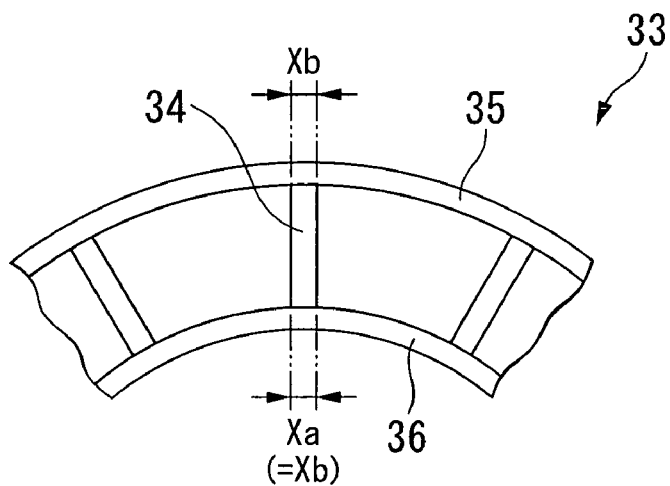
FIG. 5 is a view seen from the direction of a rotation axis O showing principal portions of the rotor frame of the axial gap motor according to the embodiment.

As is shown, for example, in FIG. 2, FIG. 4, and FIG. 5, the rotor frame 33 includes an inner cylindrical portion 36, an outer cylindrical portion 35, and a connecting portion 37. Here, the inner cylindrical portion 36 is connected by a plurality of radial direction ribs 34, . . . , and 34 that are spaced at predetermined intervals in the circumferential direction. The connecting portion 37 is formed in a toroidal plate shape that protrudes toward the inner side from the inner circumferential surface of the inner cylindrical portion 36, and is connected to an external drive shaft (for example, an input shaft of a vehicle transmission or the like).

In this embodiment, because the inner cylindrical portion 36 of the rotor frame 33 is connected to an external drive shaft, an inner side in the radial direction of the radial direction ribs 34 becomes a shaft portion side, while an outer side in the radial direction of the radial direction ribs 34 becomes a rim portion side.

A cross-sectional area in the radial direction of the radial direction ribs 34 becomes gradually larger from the outer side towards the inner side in the radial direction. The width in the circumferential direction of the radial direction ribs 34 is the same from the outer side towards the inner side in the radial direction (i.e., an inner circumferential side width Xa=an outer circumferential side width Xb). Moreover, the thickness of the radial direction ribs 34 in the direction of the rotation axis O gradually increases from the outer side towards the inner side in the radial direction, from an outer circumferential side thickness Wb to an inner circumferential side thickness Wa (>Wb). In addition, both end surfaces of the radial direction ribs 34 in the direction of the rotation axis O, namely, stator-facing surfaces 34A and 34A are inclined by a predetermined angle θ relative to the radial direction.

Figure 6:
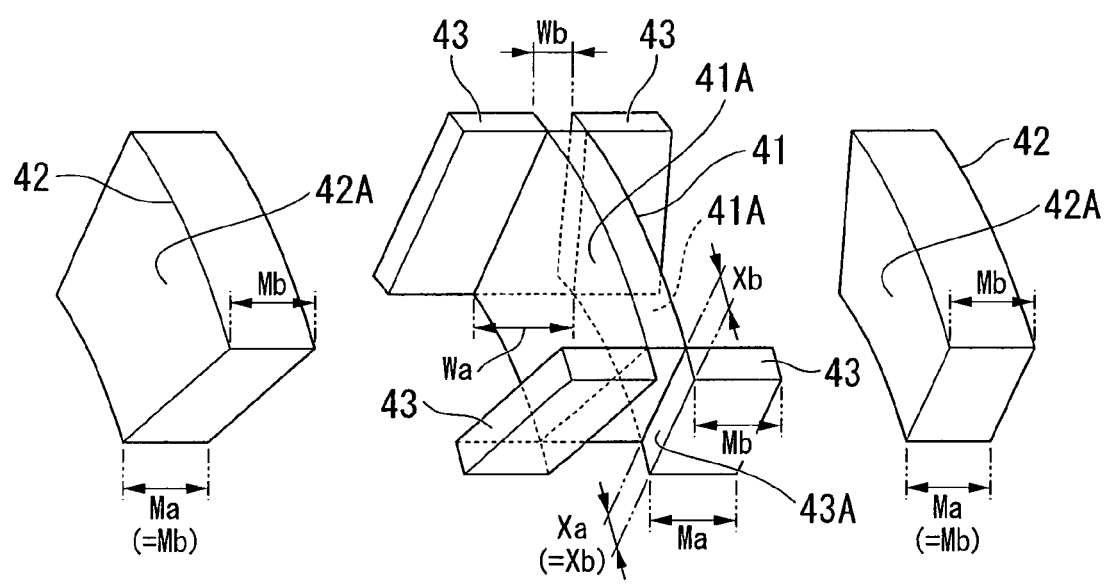
FIG. 6 is a perspective view showing principal portions of primary magnet portions and auxiliary magnet portions of the axial gap motor according to the embodiment.
Figure 7A:
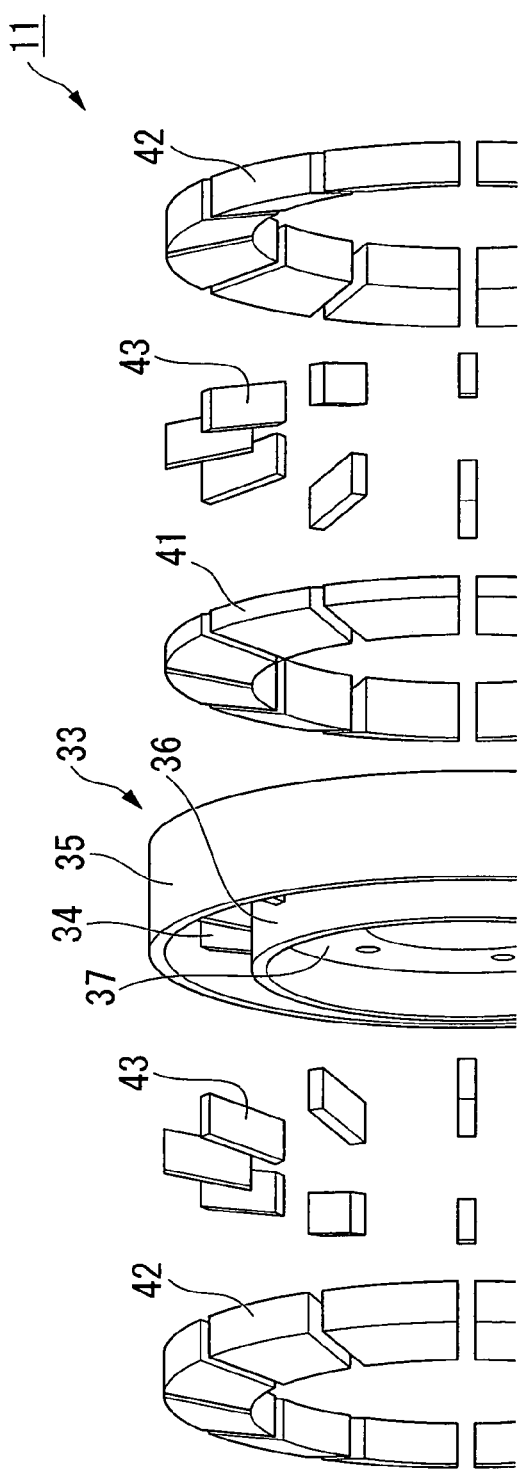
Figure 7B:
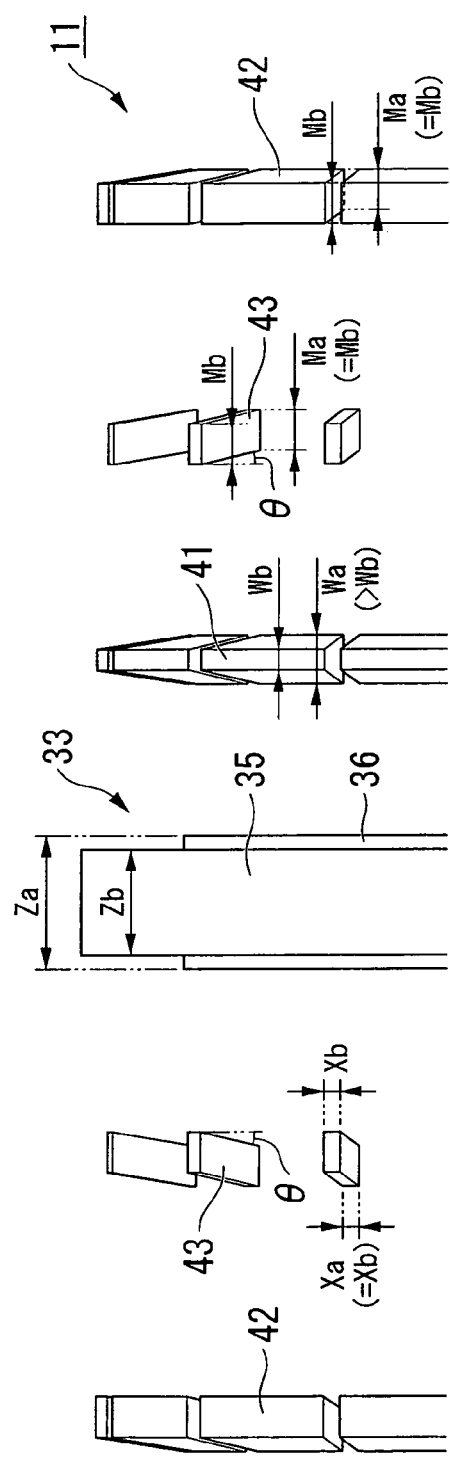
FIG. 7B is an exploded view seen from a radial direction showing principal portions of the rotor of the axial gap motor according to the embodiment.
Figure 8:
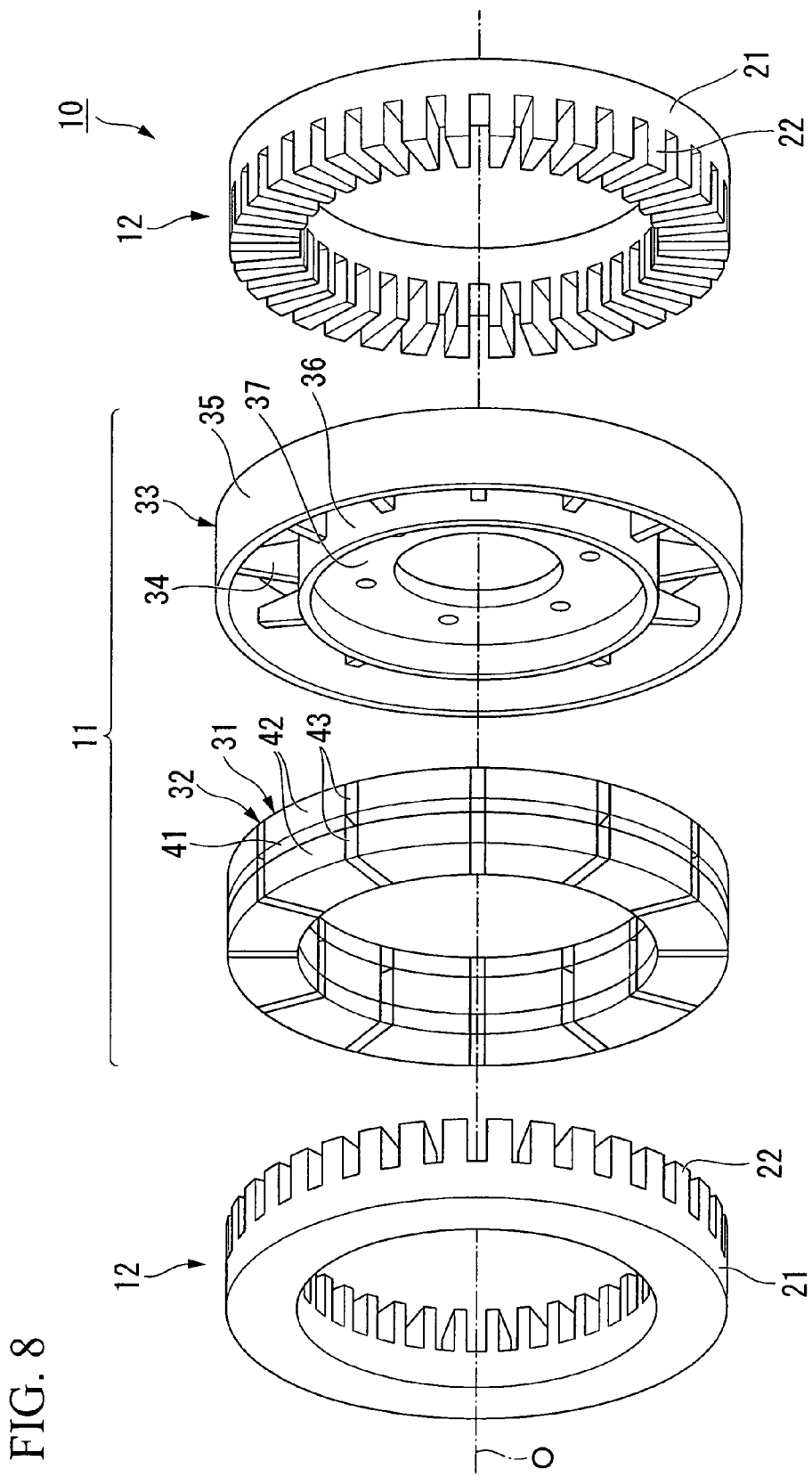
FIG. 8 is an exploded perspective view showing the rotor of the axial gap motor according to a first variant example of the embodiment.
Figure 9:
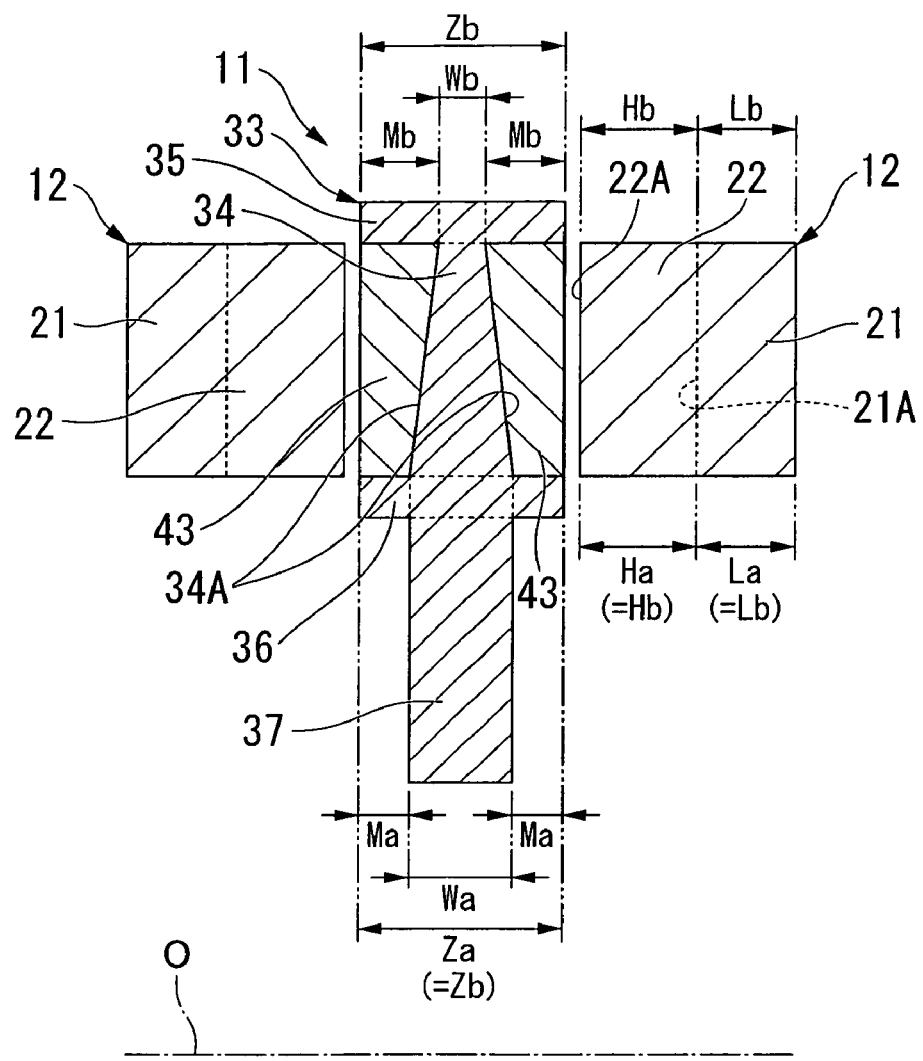
FIG. 9 is a cross-sectional view seen from a radial direction showing principal portions of the rotor of the axial gap motor according to the first variant example of the embodiment.
Figure 10:
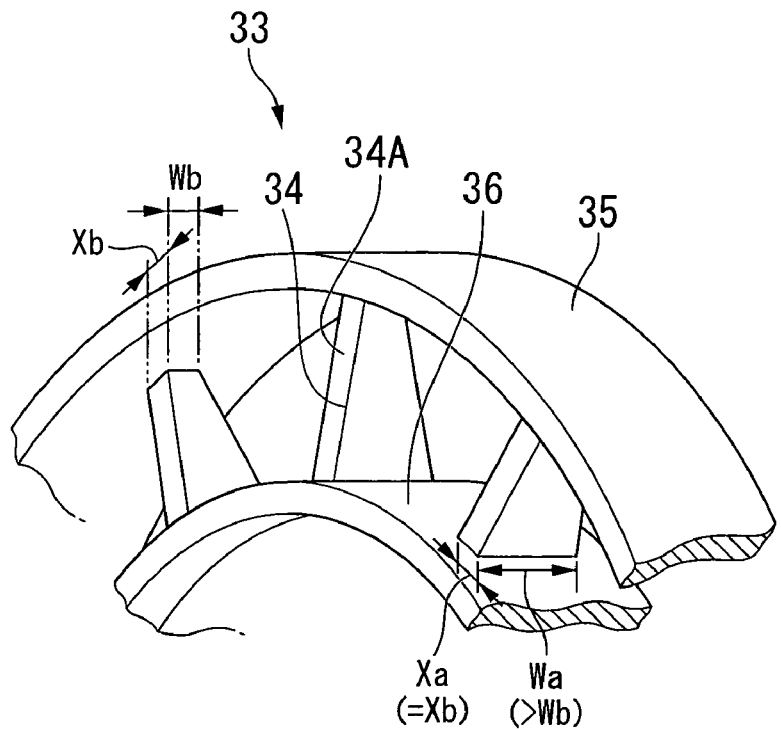
FIG. 10 is a perspective view showing principal portions of a rotor frame of the axial gap motor according to the first variant example of the embodiment.
Figure 11:
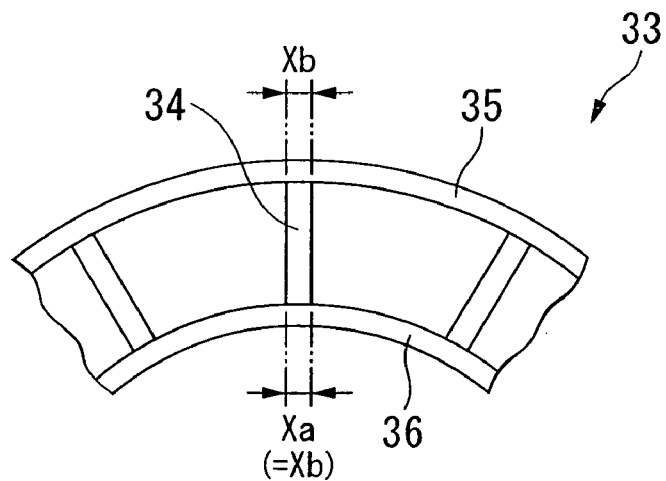
FIG. 11 is a view seen from the direction of a rotation axis O showing principal portions of the rotor frame of the axial gap motor according to the first variant example of the embodiment.
Figure 12:
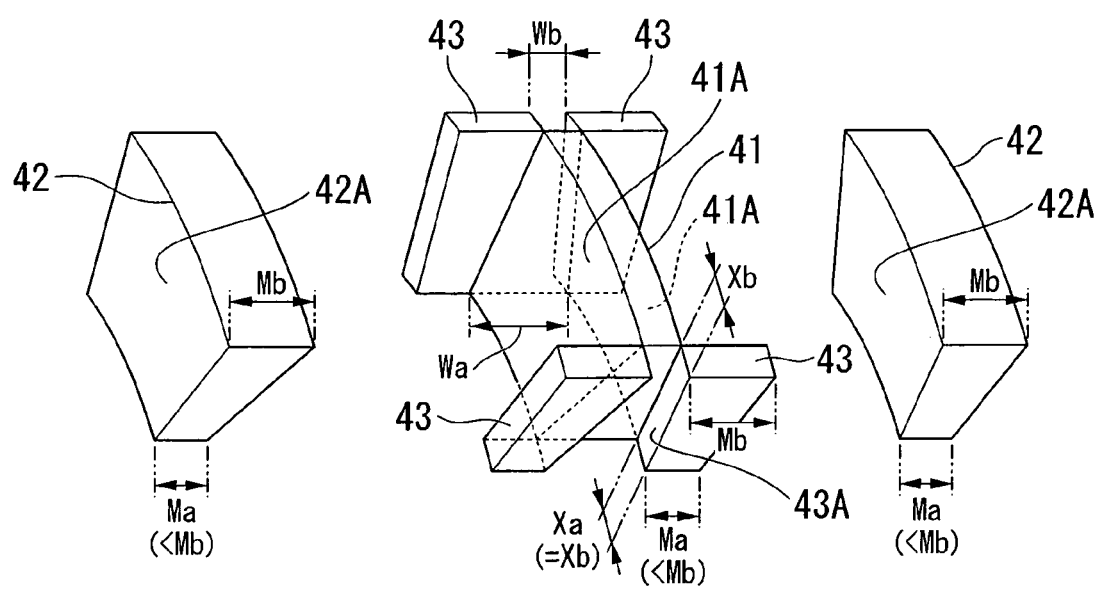
FIG. 12 is a perspective view showing principal portions of primary magnet portions and auxiliary magnet portions of the axial gap motor according to the first variant example of the embodiment.
Figure 13A:
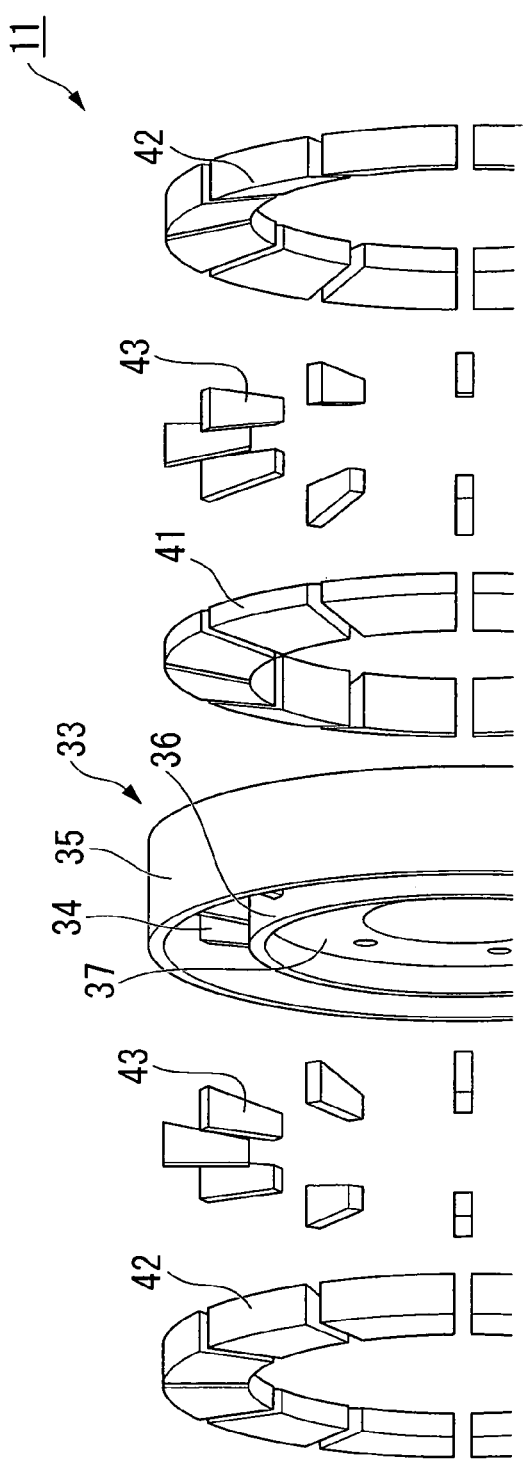
Figure 13B:
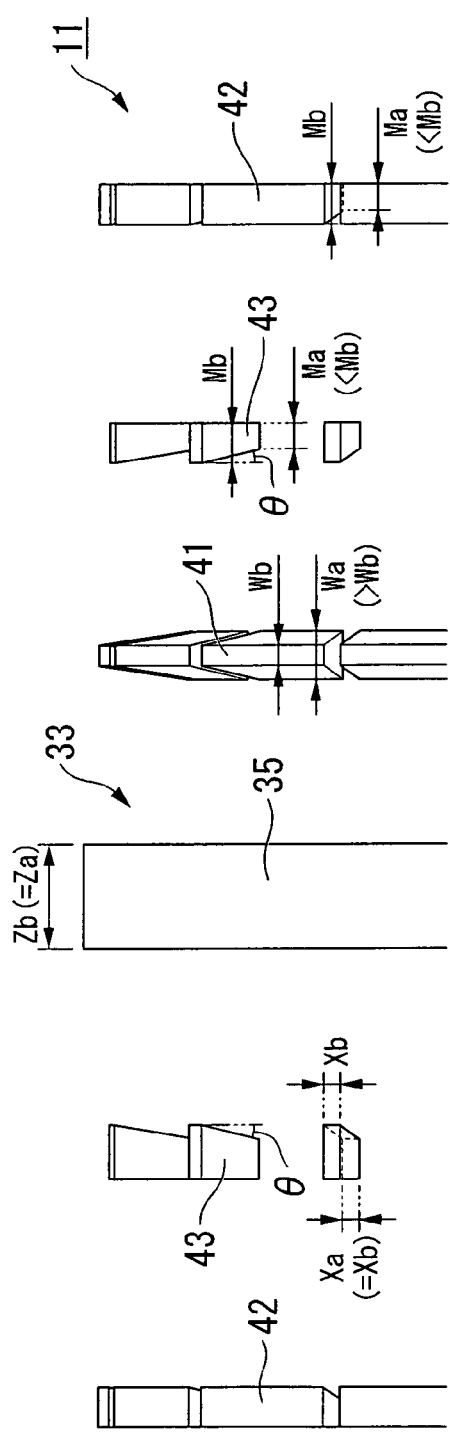
FIG. 13B is an exploded view seen from a radial direction showing principal portions of the rotor of the axial gap motor according to the first variant example of the embodiment.
Figure 14:
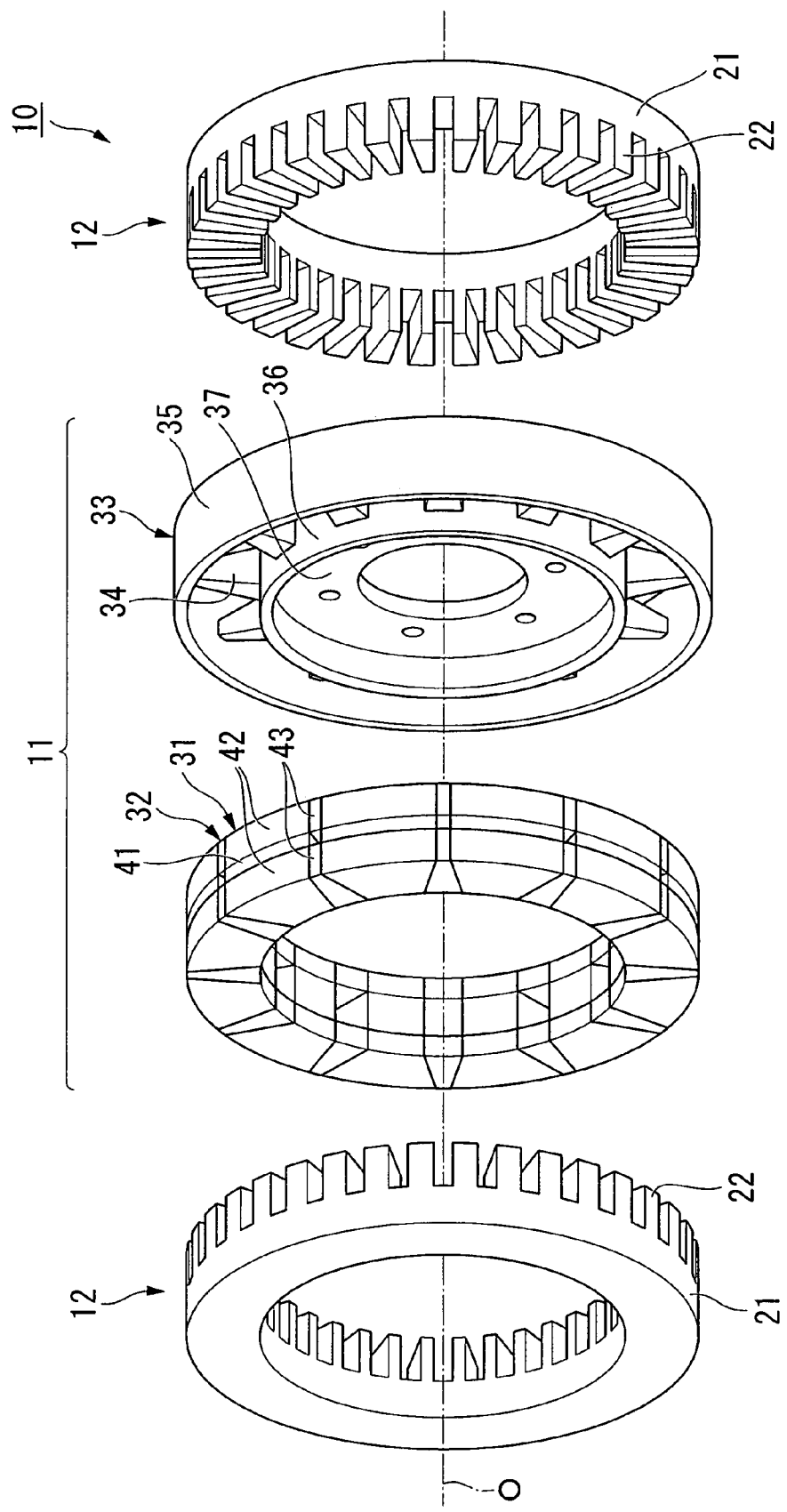
FIG. 14 is an exploded perspective view of a rotor of an axial gap motor according to a second variant example of the embodiment.
Figure 15:
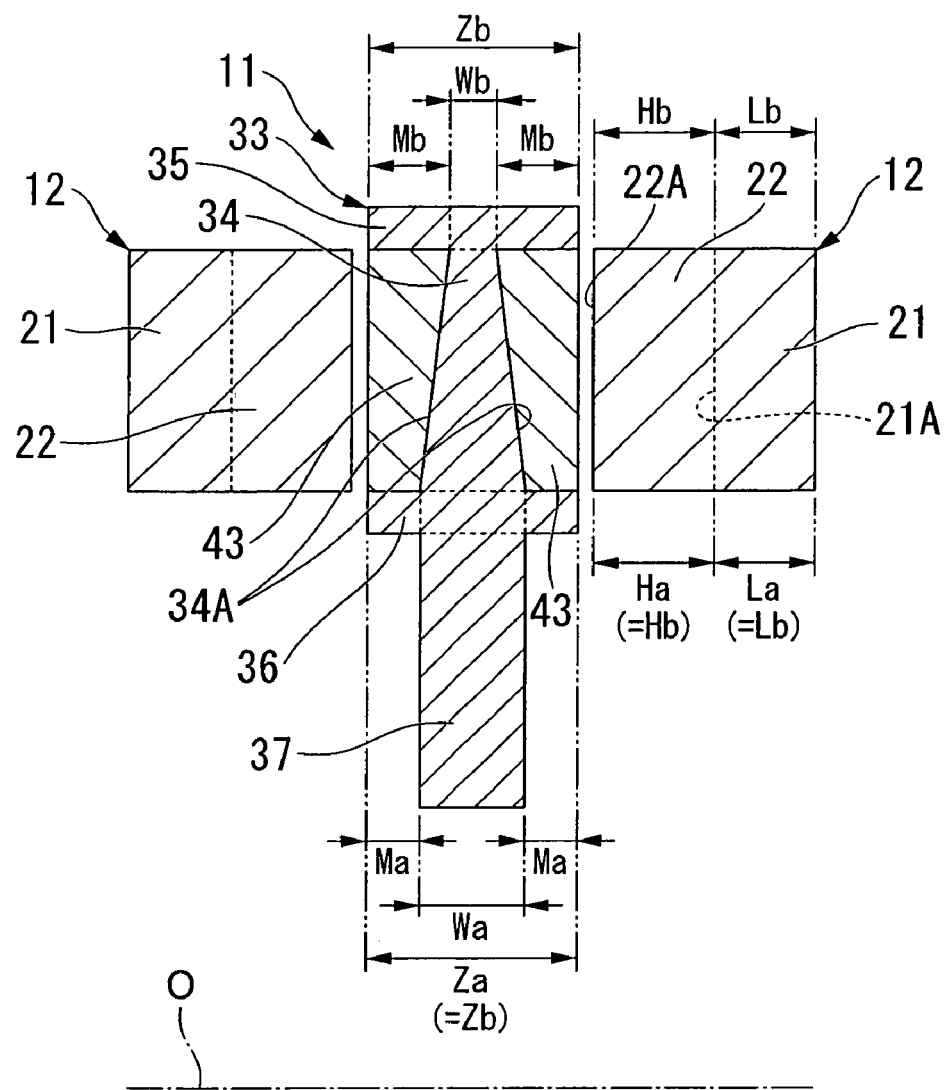
FIG. 15 is a cross-sectional view seen from a radial direction showing principal portions of the axial gap motor according to the second variant example of the embodiment.
Figure 16:
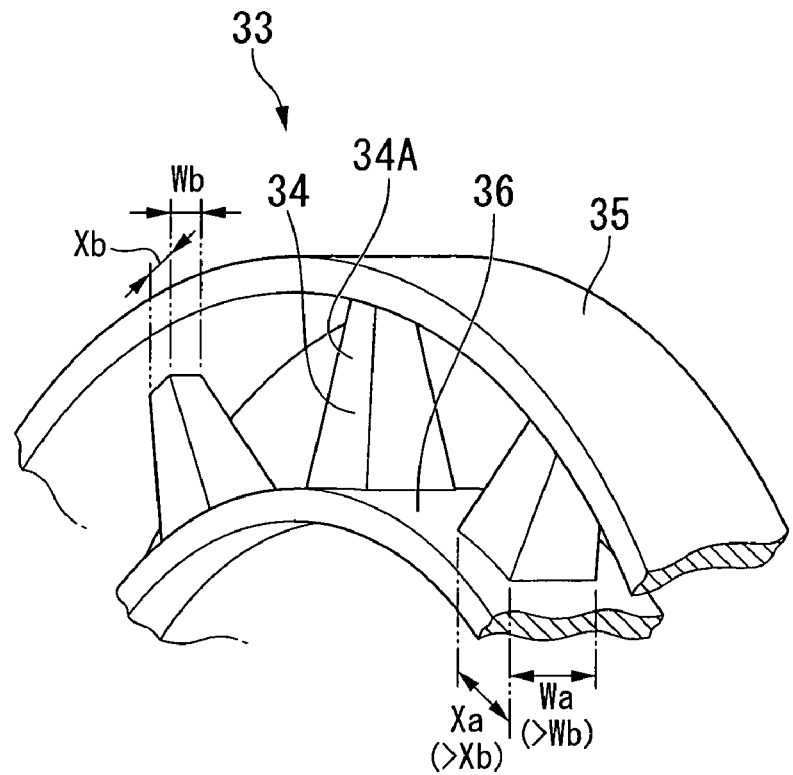
FIG. 16 is a perspective view showing principal portions of a rotor frame of the axial gap motor according to the second variant example of the embodiment.
Figure 17:
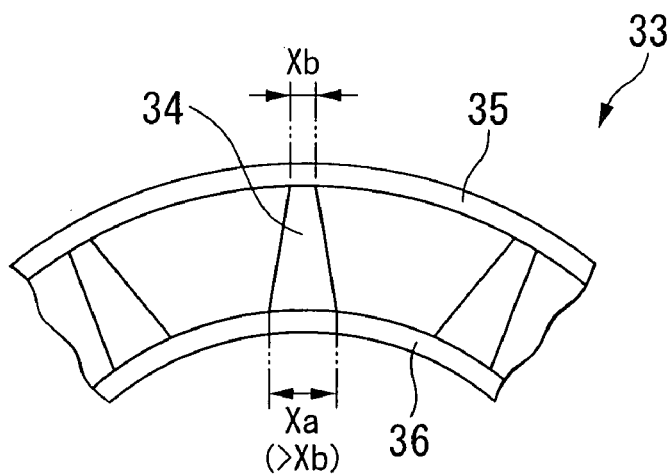
FIG. 17 is a view seen from the direction of a rotation axis O showing principal portions of the rotor frame of the axial gap motor according to the second variant example of the embodiment.
Figure 18:
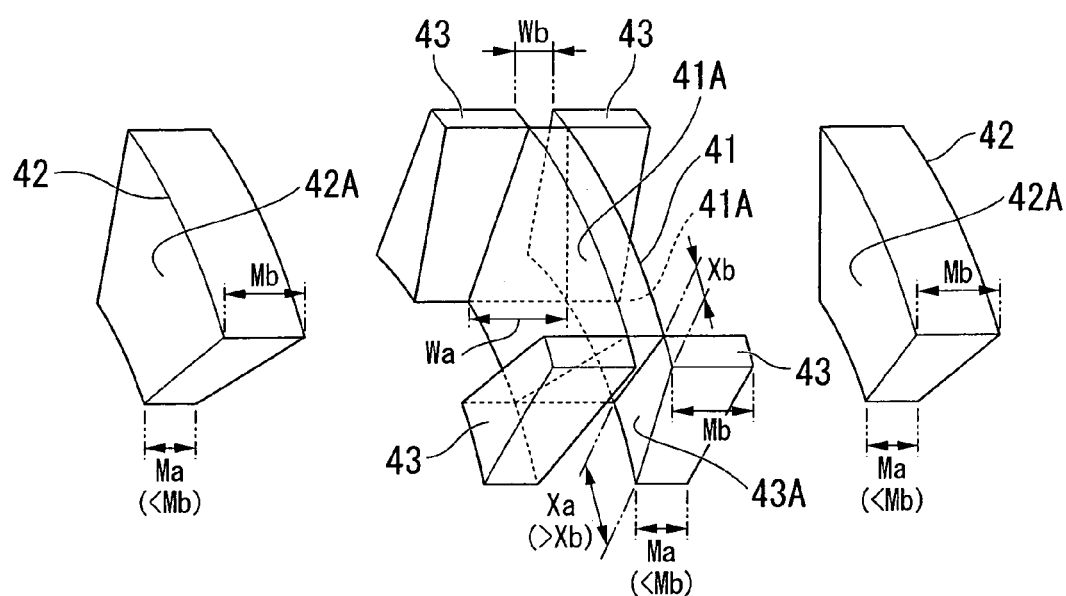
FIG. 18 is a perspective view showing principal portions of primary magnet portions and auxiliary magnet portions of the axial gap motor according to the second variant example of the embodiment.
Figure 19A:
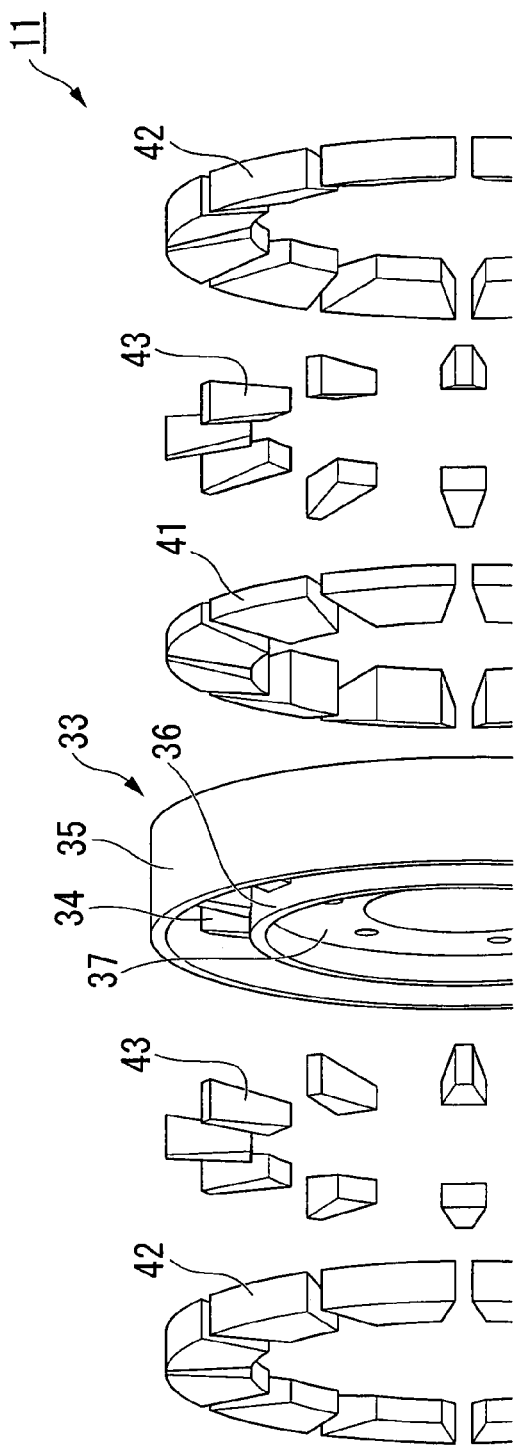
Figure 19B:
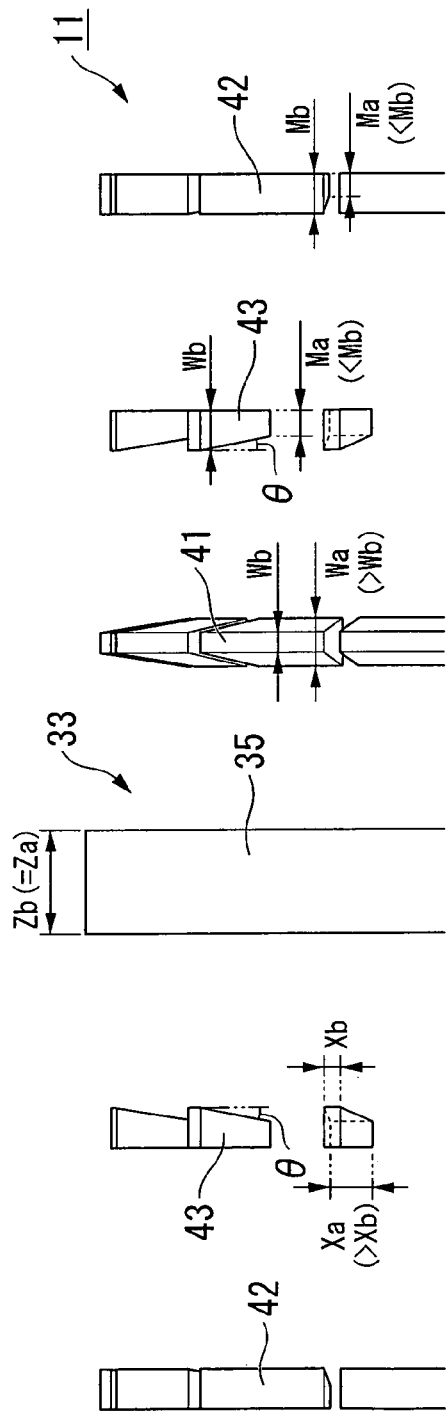
FIG. 19B is an exploded view seen from a radial direction showing principal portions of the rotor of the axial gap motor according to the second variant example of the embodiment.

As is shown in FIG. 6 and FIGS. 7A and 7B, the primary magnet portions 31 include substantially flat, fan-shaped primary permanent magnet pieces 41 that are magnetized in the thickness direction (i.e., in the direction of the rotation axis O), and a pair of substantially flat, fan-shaped magnetic substance pieces 42 and 42 that sandwich the primary permanent magnet pieces 41 from both sides in the thickness direction thereof. The respective primary permanent magnet pieces 41 and 41 of adjacent primary magnet portions 31 and 31 in the circumferential direction are set such that those polarities are mutually opposite to each other.

In addition, the plurality of primary magnet portions 31, . . . , and 31 that are housed in the rotor frame 33 are sandwiched from both ends in the radial direction by the inner cylindrical portion 36 and the outer cylindrical portion 35, and are placed so as to be adjacent to each other in the radial direction via the radial direction ribs 34.

Inside the rotor frame 33, the primary permanent magnet piece 41 of each primary magnet portion 31 is sandwiched from both sides in the circumferential direction by two radial direction ribs 34. In the same way as for the radial direction ribs 34, the thickness in the direction of the rotation axis O of the primary permanent magnet pieces 41 becomes gradually larger from the outer side towards the inner side in the radial direction, for example, from an outer circumferential side thickness Wb to an inner circumferential side thickness Wa (>Wb). As a result, end surfaces in the direction of the rotation axis O of the primary permanent magnet pieces 41 are inclined by a predetermined angle θ relative to the radial direction.

Moreover, the thickness in the direction of the rotation axis O of the magnetic substance pieces 42 is the same from the inner side towards the outer side in the radial direction (i.e., an inner circumferential side thickness Ma=an outer circumferential side thickness Mb). The two end surfaces 42A and 42A in the direction of the rotation axis O of the magnetic substance pieces 42 are formed in the same substantially fan shape as that of the stator-facing surfaces 41A of the primary permanent magnet pieces 41, and are inclined by a predetermined angle θ relative to the radial direction.

The auxiliary magnet portions 32 include a pair of auxiliary permanent magnet pieces 43 and 43 that sandwich the radial direction ribs 34 from both sides thereof in the direction of the rotation axis O inside the rotor frame 33. The pair of auxiliary permanent magnet pieces 43 and 43 which face each other in the direction of the rotation axis O are magnetized in the direction perpendicular to the rotation axis O and the radial direction (i.e., in a substantially circumferential direction), and those polarities are mutually opposite to each other.

The thickness in the direction of the rotation axis O of the auxiliary permanent magnet pieces 43 is the same from the outer side towards the inner side in the radial direction (i.e., an inner circumferential side thickness Ma=an outer circumferential side thickness Mb). In addition, the width in the circumferential direction of the auxiliary permanent magnet pieces 43 is the same from the inner side towards the outer side in the radial direction (i.e., an inner circumferential side width Xa=an outer circumferential side width Xb). Moreover, the two end surfaces 43A and 43A in the direction of the rotation axis O of the auxiliary permanent magnet pieces 43 are formed in the same substantially rectangular shape as that of the stator-facing surfaces 34A of the radial direction ribs 34, and are inclined by a predetermined angle θ relative to the radial direction.

In addition, the auxiliary permanent magnet pieces 43 and 43 of auxiliary magnet portions 32 and 32 which are adjacent in the circumferential direction sandwich the magnetic substance pieces 42 of the primary magnet portions 31 from both sides in the circumferential direction.

The pair of auxiliary permanent magnet pieces 43 and 43 which face each other in the circumferential direction via the magnetic substance pieces 42 are magnetized in mutually opposite directions.

In addition, the pair of auxiliary permanent magnet pieces 43 and 43 that are placed on one side in the direction of the rotation axis O each face the same magnetic pole as the magnetic pole on the one side of the primary permanent magnet pieces 41 that are magnetized in the direction of the rotation axis O. The pair of auxiliary permanent magnet pieces 43 and 43 that are placed on the other side in the direction of the rotation axis O are each positioned so as to face the same magnetic pole as the magnetic pole on the other side of the primary permanent magnet pieces 41 that are magnetized in the direction of the rotation axis O.

Namely, in a primary permanent magnet piece 41 that has one side in the direction of the rotation axis O having an N polarity and has the other side having an S polarity, a pair of auxiliary permanent magnets pieces 43 and 43 that sandwich from both sides in the circumferential direction a magnetic substance piece 42 on one side in the direction of the rotation axis O are positioned such that their N poles face each other in the circumferential direction. Moreover, a pair of auxiliary permanent magnets pieces 43 and 43 that sandwich from both sides in the circumferential direction a magnetic substance piece 42 on the other side in the direction of the rotation axis O are positioned such that their S poles face each other in the circumferential direction.

As a result, the respective magnetic fluxes of the primary permanent magnet pieces 41 and the respective auxiliary permanent magnet pieces 43 and 43 are converged by the magnetic flux lens effect created by what is known as a Halbach arrangement of the permanent magnets, and the effective magnetic flux that interlinks with the respective stators 12 and 12 increases relatively.

In this embodiment, in conjunction with the fact that the thickness in the direction of the rotation axis O of both the radial direction ribs 34 of the rotor frame 33 and the primary permanent magnet pieces 41 of the respective primary magnet portions 31 gradually increases from the outer side towards the inner side in the radial direction, for example, from an outer circumferential side thickness Wb to an inner circumferential side thickness Wa (>Wb), a width Za in the direction of the rotation axis O of the inner cylindrical portion 36 of the rotor frame 33 becomes larger than the width Zb in the direction of the rotation axis O of the outer cylindrical portion 35.

As has been described above, according to the axial gap motor 10 of the present embodiment, for the inner cylindrical portion 36 of the rotor frame 33 that is connected to an external drive shaft and to which torque is transmitted, and the outer cylindrical portion 35 that is connected via the plurality of radial direction ribs 34, . . . , and 34 to this inner cylindrical portion 36, the thickness in the direction of the rotation axis O of the radial direction ribs 34 gradually increases from the outer side (i.e., the rim portion side) towards the inner side (i.e., the shaft portion side) in the radial direction, from the outer circumferential side thickness Wb to the inner circumferential side thickness Wa (>Wb). Because of this, compared with a case in which, for example, the thickness in the direction of the rotation axis O of the radial direction ribs 34 does not change in the radial direction, the rigidity of the rotor frame 33 is improved, which results in the natural frequency of the rotor frame 33 increasing. As a result of this, even when the rotor frame 33 is rotating at high speed, there is no resonance, and stable rotation can be obtained.

Moreover, the rotor facing surface 22A of the teeth 22 of each stator 12, the stator facing surfaces 41A of the primary permanent magnets 41, and the end surfaces 43A of the auxiliary permanent magnet pieces 43 are inclined at a predetermined angle θ relative to the radial direction. Because of this, compared with a case in which, for example, the rotor facing surface 22A, the stator facing surfaces 41A, and the end surfaces 43A are parallel to the radial direction with the same dimensions in the radial direction, the surface area of the thrust generating surface (i.e., the rotor facing surface 22A, the stator facing surfaces 41A, and the end surfaces 43A) increases. As a result, it is possible to increase the torque that can be output.

Note also that in the above described embodiment, the thickness in the direction of the rotation axis O of the magnetic substance piece 42 of the rotor 11 and the thickness in the direction of the rotation axis O of the auxiliary permanent magnet pieces 43 has been made the same from the inner side towards the outer side in the radial direction (i.e., the inner circumferential side thickness Ma=the outer circumferential side thickness Mb) however, the present invention is not limited to this. For example, as in the case of a first variant example shown in FIG. 8 through FIG. 13B, it is also possible for the thickness in the direction of the rotation axis O of the magnetic substance piece 42 of the rotor 11 and the thickness in the direction of the rotation axis O of the auxiliary permanent magnet pieces 43 to be made to gradually decrease from the outer side towards the inner side in the radial direction, for example, from the outer circumferential side thickness Mb to the inner circumferential side thickness Ma (<Mb). Moreover, it is also possible for that end surface 42A of the magnetic substance piece 42 which faces the stator 12, and that end surface 43A of the auxiliary permanent magnet pieces 43 which faces the stator 12 to be parallel to the radial direction, and for that end surface 42A of the magnetic substance piece 42 which faces the stator facing surfaces 41A of the primary permanent magnet pieces 41, and that end surface 43A of the auxiliary permanent magnet pieces 43 which faces the stator facing surfaces 34A of the radial direction ribs 34 of the rotor frame 33 to be inclined at a predetermined angle θ relative to the radial direction.

In this first variant example, the rotor facing surface 21A of the yoke portion 21 of each stator 12 is parallel to the radial direction. The thickness in the direction of the rotation axis O of the yoke portion 21 is the same from the inner side towards the outer side in the radial direction (i.e., the inner circumferential side thickness La=the outer circumferential side thickness Lb). The rotor facing surfaces 22A of the teeth 22 are parallel to the radial direction in the same way as the yoke portions 21.

In this first variant example, in conjunction with the fact that the thickness in the direction of the rotation axis O of the magnetic substance piece 42 of the rotor 11 and the thickness in the direction of the rotation axis O of the auxiliary permanent magnet pieces 43 gradually decrease from the outer side towards the inner side in the radial direction, for example, from the outer circumferential side thickness Mb to the inner circumferential side thickness Ma (<Mb), the width Za in the direction of the rotation axis O of the inner cylindrical portion 36 of the rotor frame 33 is the same as the width Zb in the direction of the rotation axis O of the outer cylindrical portion 35.

Note that in the above described embodiment and first variant example, the width in the circumferential direction of the radial direction ribs 34 of the rotor frame 33 has been made the same from the inner side towards the outer side in the radial direction (i.e., the inner circumferential side width Xa=the outer circumferential side width Xb), however, the present invention is not limited to this. For example, as in a second variant example shown in FIG. 14 through FIG. 19B, it is also possible for the width in the circumferential direction of the radial direction ribs 34 to be made to gradually increase from the outer side towards the inner side in the radial direction, for example, from the outer circumferential side width Xb to the inner circumferential side width Xa (>Xb).

In this second variant example, the width in the circumferential direction of the auxiliary permanent magnet pieces 43 gradually increases from the outer side towards the inner side in the radial direction, for example, from the outer circumferential side width Xb to the inner circumferential side width Xa (>Xb).

According to the axial gap motor 10 of this second variant example, by gradually increasing the width in the circumferential direction from the outer side towards the inner side in the radial direction in addition to the thickness in the direction of the rotation axis O of the radial direction ribs 34, it is possible to improve even further the rigidity of the rotor frame 33, compared with a case in which, for example, the thickness in the direction of the rotation axis O and the width in the circumferential direction of the radial direction ribs 34 do not change in the radial direction.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. An axial gap motor comprising a rotor that is rotatable around a rotation axis; and stators that face the rotor on at least one side in the direction of the rotation axis, wherein:
    the rotor is provided with a plurality of primary magnet portions, a plurality of auxiliary magnet portions, and a rotor frame;
    the rotor frame is provided with a plurality of ribs that extend in the radial direction of the rotor frame, and a shaft portion and a rim portion that are integrally connected with each other via the ribs, and the rotor frame houses the primary magnet portions and the auxiliary magnet portions that are placed alternatingly in the circumferential direction thereof between the shaft portion and the rim portion;
    the primary magnet portions are provided with primary permanent magnet pieces that are magnetized in the direction of the rotation axis, and that are positioned between two ribs which are adjacent in the circumferential direction;
    the auxiliary magnet portions are provided with auxiliary permanent magnet pieces that are magnetized in a direction that is orthogonal to the direction of the rotation axis and to the radial direction, and that are positioned on at least one side of the ribs in the direction of the rotation axis; and
    each of cross-sectional areas of the ribs which is perpendicular to the radial direction increases from the rim portion side towards the shaft portion side in the radial direction.

2. The axial gap motor according to claim 1, wherein:
    the thickness of the ribs in the direction of the rotation axis increases from the rim portion side towards the shaft portion side in the radial direction; and
    the thickness of the primary permanent magnet pieces in the direction of the rotation axis increases from the rim portion side towards the shaft portion side in the radial direction.

3. The axial gap motor according to claim 1, wherein the width of the ribs in the circumferential direction increases from the rim portion side towards the shaft portion side in the radial direction.

4. The axial gap motor according to claim 1, wherein both end surfaces of the auxiliary permanent magnet pieces in the direction of the rotation axis are parallel to each other.

5. The axial gap motor according to claim 1, wherein:
    the stator is provided with a pair of a first stator and a second stator that face with each other in the direction of the rotation axis and that sandwich the rotor from both sides in the direction of the rotation axis; and
    the auxiliary permanent magnet pieces are provided with a pair of a first auxiliary magnet piece and a second auxiliary permanent magnet piece that are positioned on both sides in the direction of the rotation axis of the ribs.

* * * * *